United States Patent
Bowen et al.

(10) Patent No.: US 6,770,254 B2
(45) Date of Patent: Aug. 3, 2004

(54) PURIFICATION OF GROUP IVB METAL HALIDES

(75) Inventors: Heather Regina Bowen, San Diego, CA (US); David Allen Roberts, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 200 days.

(21) Appl. No.: 10/052,052

(22) Filed: Jan. 17, 2002

(65) Prior Publication Data

US 2003/0133861 A1 Jul. 17, 2003

(51) Int. Cl.[7] .................. C01G 23/02; C01G 25/02; C01G 27/04
(52) U.S. Cl. .................. 423/492; 423/240 R; 423/77; 423/76
(58) Field of Search .................. 423/492, 240 R, 423/240 S, 75, 76, 77

(56) References Cited

U.S. PATENT DOCUMENTS

| | | | | |
|---|---|---|---|---|
| 2,543,591 A | * | 2/1951 | Nowicke | 203/29 |
| 3,627,481 A | | 12/1971 | Sironi et al. | |
| 3,655,344 A | * | 4/1972 | Mitchell et al. | 23/299 |
| 3,742,612 A | * | 7/1973 | Pefferman | 34/356 |
| 3,871,874 A | | 3/1975 | Winter | |
| 3,939,244 A | * | 2/1976 | Piccolo et al. | 423/76 |
| 4,070,252 A | * | 1/1978 | Bonsack | 203/29 |
| 4,356,160 A | * | 10/1982 | Makino et al. | 423/492 |
| 4,578,252 A | | 3/1986 | Pastor et al. | 423/76 |
| 4,731,230 A | | 3/1988 | Lailach et al. | |
| 4,783,324 A | * | 11/1988 | Walters et al. | 423/70 |
| 4,965,055 A | | 10/1990 | Nordquist et al. | 423/492 |
| 5,437,854 A | * | 8/1995 | Walker et al. | 423/492 |
| 6,090,709 A | | 7/2000 | Kaloyeros et al. | 438/685 |

FOREIGN PATENT DOCUMENTS

GB 596576 1/1948

* cited by examiner

*Primary Examiner*—Ngoc-Yen Nguyen
(74) *Attorney, Agent, or Firm*—Geoffrey L. Chase

(57) ABSTRACT

This invention relates to an improved process for removing trace levels of Group IVb contaminants from a Group IVb metal tetrahalide of and particularly to a process for removing zirconium tetrachloride from titanium tetrachloride. The improvement resides in contacting a titanium tetrachloride feedstock containing trace impurities of zirconium tetrachloride or hafnium tetrachloride with a sufficient amount of titanium hydride to convert any zirconium tetrachloride or hafnium tetrachloride to a lower volatile compound. The resultant mixture is distilled and the titanium tetrachloride separated from the lower volatile zirconium or hafnium compounds.

13 Claims, No Drawings

PURIFICATION OF GROUP IVB METAL HALIDES

BACKGROUND OF THE INVENTION

Group IVb metal tetrahalides find use in the manufacture of integrated circuits and heavy metal glasses for fiber optics. In the manufacture of the integrated circuits and glasses, the industry desires a high purity Group IVb metal substantially free of trace elements. However, in the manufacture of Group IVb metal tetrahalides, e.g., titanium tetrahalide, trace levels of zirconium, hafnium and possibly Group Vb metals, such as niobium and tantalum may be present. It is desired that these metals be reduced in concentration from the Group IVb metal halide.

One of the commercially desirable products for use in producing integrated circuits is titanium tetrachloride. Titanium tetrachloride is a reactive liquid, with a normal boiling point of 136° C., the vapor of which finds use in processes for the deposition of titanium nitride or titanium silicide films in large scale integrated circuits by chemical vapor processes, CVD. The overall performance of the circuit can be very sensitive to impurities that are present in the precursor material and which is deposited. Titanium purity is of high importance to the industry, with desired purities of 99.99999+% with respect to primarily metallic and metalloidal impurities.

Commercially available titanium tetrachloride contains trace levels of zirconium with typical levels of 500 ppb (part per billion by weight, hereinafter). The semiconductor industry users of titanium tetrachloride desire that the zirconium levels be less than 1 ppb. Separation of Group IVb metal halides, such as zirconium tetrachloride, a common impurity, from titanium tetrachloride is difficult. Conventionally, distillation has been used as a means for effecting purification. However, multiple distillation passes, or use of multiple plate distillation processes, often are required to reach the acceptable levels, e.g., the 1 ppb level contaminant metal.

Most recently, the deposition of thin films of zirconium and hafnium oxides by atomic layer deposition from their respective halides have been recently described. These thin film precursors also require high purity sources of zirconium and hafnium tetrahalides.

The following patents describe methods for the purification of tetrahalides of Group IVb metals and their use in semiconductor and glass applications.

U.S. Pat. No. 4,578,252 discloses a process for the removal of iron impurities in zirconium and hafnium tetrafluorides which are used in preparing heavy-metal fluoride glasses. The process for producing ultra-high purity gases comprises the steps of applying an electromotive force to the metal fluorides during distillation or sublimation. Iron cations are converted to non-volatile iron metal and thereby removed during distillation.

U.S. Pat. No. 6,090,709 discloses methods for effecting chemical vapor deposition of titanium based films, e.g., titanium metal, titanium nitride and titanium silicide from titanium tetrachloride and other tetrahalides. Deposition of these films is effected in a chamber wherein the substrate is contacted with a titanium halide, a gas selected from ammonia, and hydrazine and a second gas selected from hydrogen, nitrogen argon or xenon.

U.S. Pat. No. 4,965,055 discloses a process for the ultra purification of metal halides, e.g., zirconium and hafnium chlorides. The prior art in this patent employed combinations of sublimation and distillation to effect purification. The patentees suggest a dissolving the metal halide in the presence of a complexing agent with complexes with the halide to form a soluble anionic or cationic complex. The metal impurities form a complex having a charge opposite the metal halide complex thereby allowing for separation in an ion exchange column.

U.S. Pat. No. 4,356,160 discloses a process for reducing titanium tetrachloride to titanium trichloride for use in olefin polymerization. The process comprises reacting the titanium tetrachloride with hydrogen in the presence of an ether, e.g., diethyl ether, and a Group 1B, IIB, IVB and VIII metal;

BRIEF SUMMARY OF THE INVENTION

This invention relates to an improved process for removing trace levels of Group IVb and Vb metals, that will be referred to as the "contaminants" from a Group IVb metal tetrahalide, and particularly, for the reduction of zirconium and hafnium from titanium tetrahalide. The process is particularly suited for generating a high purity Group IVb metal tetrahalide. The improvement in the process for reducing trace levels of a contaminant Group IVb and Group Vb metal comprises the steps of (a) contacting said Group IVb metal tetrahalide containing trace levels of a Group IVb metal contaminant or a Group Vb metal contaminant or both, with a sufficient amount of a hydride selected from one of the Group IVb metals under conditions for converting said volatile Group IVb and Group Vb contaminants to a lower volatility compound that enhances the removal of those metal contaminants by distillation or sublimation; (b) separating the Group IVb metal tetrahalide from said lower volatility compound by distillation, and (c) recovering the resulting Group IVb metal tetrahalide as an overhead fraction.

There are several advantages that can be achieved by this process and these include:

an ability to reduce the level of contaminant zirconium and hafnium or both from a titanium tetrachloride feedstock to very low levels thus rendering the resulting ultra high purity titanium tetrachloride suited for titanium film formation by chemical vapor deposition and other means employed in integrated circuit production;

an ability to eliminate heavy metal impurities from a Group IVb metal tetrahalide feedstock without substantial loss of product;

an ability to remove trace metal contaminants in a one-pass operation; and, an ability to remove heavy metal halides from titanium tetrachloride in conventional equipment.

DETAILED DESCRIPTION OF THE INVENTION

Removal or reduction of trace levels of Group IVb metal and Group Vb metal contaminants from Group IVb metal tetrahalides, and particularly for the reduction of zirconium and hafnium tetrahalide from titanium tetrahalide, is highly desired. Often these Group IVb metals are also contaminated with trace levels of contaminant Group Vb metals such as niobium and tantalum and these metals can also be converted to compounds of lower volatility. Set forth is a description of a process for reducing trace levels of contaminant metals from a Group IVb metal tetrahalide feedstock.

The initial step of the process comprises (a) contacting said Group IVb metal tetrahalide feedstock containing trace Group IVb or Group Vb contaminants with a sufficient amount of a Group IVb metal hydride, e.g., titanium hydride and zirconium hydride, under conditions for converting said Group IVb metal or Group Vb metal contaminants to lower volatility species that that are more effectively removed in a distillation process. Contacting temperatures typically range from 50 to 150° C. The preferred Group IVb tetrahalides to be reduced in contaminants are the chlorides, bromides and iodides and, most preferably the chlorides of titanium.

The Group IVb metal employed in the hydride might be any of the Group IVb homoleptic hydrides but selection of the metal that is the same as that of the tetrahalide being purified precludes the addition of a potentially contaminating metal source. A number of other simple hydride sources, i.e., LiH, NaH, KH, LiAlH$_4$, may be used. NbH3, might also be expected to reduce the Group IVb and Vb metal contaminants, but it may result in adding a non-Group IVb material. In some cases it may be acceptable to add the hydride of another Group IV or Group V metal that is already present as a contaminant if it results in more efficacious removal of contaminants. It is even conceivable that other hydrides and possibly other forms of the Group IVb metal may be used, the addition of a different metal can contribute to contamination. Not only can the metal, e.g., lithium from its hydride add to contamination, other forms than the hydride of the metal, e.g., an organometallic ligand, can also lead to contamination. Therefore, the reactant suited for converting the Group IVb and the Group IVb contaminants to compounds of lower volatility is ideally the hydride of the Group IVb metal tetrahalide to be purified. In the purification of titanium tetrahalides, titanium hydride is preferably used as the reactant. In the purification of zirconium tetrahalide, zirconium hydride is the reactant and so on.

The common form of the Group IVb metal tetrahalide employed in forming integrated circuits is the tetrachloride, due in large part to its relatively high volatility. The properties are summarized in Table I. Other tetrahalides are used for other applications, e.g., the tetrafluorides are used in producing heavy metal glasses. Tetraiodides and tetrabromides are employed for other applications. As long as the hydride of the Group IVb metal is employed, the resultant gases formed on reduction of the contaminant Group IVb and Group Vb metal tetrahalides are highly volatile and easily separated from the product Group IVb metal tetrahalide that is the subject of purification.

Once the conversion is effected, step (b), which comprises separating the Group IVb metal tetrahalide from said lower volatile compound, can be effected by distillation or sublimation. Conversion of the Group IVb and Group Vb metals to lower volatile compounds than the Group IVb metal to be purified can be performed prior to distillation or during the distillation process itself. The conversion proceeds quickly at distillation temperatures. Therefore, it is preferred to add the Group IVb metal hydride to the reboiler of the distillation column thus, providing for a one step process.

Separation of the Group IVb metal tetrahalide from the lower volatile contaminating Group IVb and Group Vb metal halides is effected by distilling the mixture of the Group IVb metal tetrahalide and the Group IVb and Group Vb metal compounds of lower volatility. The Group IVb metal tetrahalide is recovered as an overhead fraction. Sometimes it may be necessary for the recovery of Group IVb metal tetrahalides other than titanium tetrachloride to dissolve them in a nonreactive medium to allow intimate contact with the hydride purification agent; then the non reacting media is removed prior to purification of the product by distillation or sublimation.

In a specific embodiment of this invention trace impurities of the tetrachlorides of zirconium and hafnium are separated from titanium tetrachloride. In that process, titanium hydride is contacted with a feedstock of titanium tetrachloride contaminated with zirconium or hafnium impurities, e.g., the tetrachloride, under conditions for converting the zirconium and hafnium tetrachloride impurities to compounds of lower volatility. On formation of the lower volatile compounds, the products can be separated by distillation and a high purity titanium tetrachloride recovered.

In the process the Group IVb metal hydride, e.g., titanium hydride (TiH$_2$), is contacted with or added to the distillation system in at least quantity necessary to remove the level of Group IVb or Group Vb metals desired. In practical terms at least a stoichiometric amount, and preferably an excess of Group IVb metal hydride is added. The stoichiometric levels of Group IVb metal hydride can be determined per the following equation.

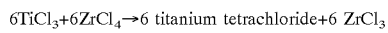

Although the above equations speculate on a possible mechanism involving the generation of a reaction product reduced volatility (Zr(III)Cl$_3$), they can be used for determining the level of a Group IVb metal hydride, e.g., titanium hydride, to add to the feedstock to effect reduction of the metal impurities. Typically levels of 0.01% to 0.1% by weight of the tetrahalide to be treated are effective. The addition of a metal hydride to this process is unique. In this case a Group IVb metal hydride which is the hydride of the same metal as the Group IVb metal in the Group IVb metal tetrahalide to be purified does not introduce a contaminating, e.g., non-titanium, metal source.

As stated previously, the hydride, titanium in the case of titanium tetrachloride purification, can be added to the feedstock prior to distillation or during the distillation process itself. The elevated temperatures and times for distillation provides the necessary conditions for the zirconium and the hafnium tetrachloride, in particular, to form compounds of significantly lower volatility than titanium tetrachloride. These compounds can be easily separated in the distillation process.

At elevated temperatures of distillation, the zirconium levels in titanium tetrachloride can be reduced to less than 1 part per billion (ppb). Also, other IVB and VB elements, e.g., Hf, V, Nb and Ta can be reduced to almost undetectable levels, e.g., at levels of 10 parts per trillion (ppt).

The following examples are provided to illustrate various embodiments of the invention and are not intended to restrict the scope thereof.

EXAMPLE 1

Titanium Tetrachloride Purification

Experimental work on the treatment of titanium tetrachloride with the TiH$_2$ has occurred at elevated temperature, between 60 and 144° C. A primary trial was conducted using heels from an Oldershaw distillation column that had a concentrated amount of zirconium. The primary trial was conducted at 60° C. The primary trial was successful at reducing the zirconium level.

After the initial success with heels on a small scale, a second attempt was made, treating normal raw titanium tetrachloride feedstock containing zirconium in the 500 ppb range. The feedstock was initially filtered to remove any solid precipitates, treated with $TiH_2$ at 60° C., and then distilled in the Oldershaw column. Specifically, 38 kilograms of titanium tetrachloride contaminated with $ZrCl_4$ at a level of 500 ppb is reduced to zirconium levels of less than 1 ppb and the other column IVb and Vb metal elements with approximately 6 grams of $TiH_2$. In addition the levels of Hf were reduced from 3 ppb typical to 0.04 ppb; V from 8 ppb to 0.01 ppb; and Nb from 302 ppb to 0.01 ppb.

EXAMPLE 2

Addition of Titanium Hydride to Distillation Reboiler

In an effort to streamline the process as represented by Example 1, titanium hydride is added directly to the Oldershaw reboiler in an effort to make the treatment a on-step process. The reboiler is heated to 144° C. skin temperature for effecting conversion of the zirconium to a nonvolatile which is recovered in the heels.

Oldershaw heels treated with $TiH_2$ have been flashed to dryness and the solids analyzed by ICP-MS and GFAAS. The results show a high concentration of zirconium (19 ppm) as well as concentrated levels of Nb, V, Ta and Hf.

Analysis does not show what form the elements are in, i.e., tetrahalide or trihalide forms of zirconium but these elements do not distill over into the main titanium tetrachloride fraction as in untreated batches.

The present invention has been set forth with regard to several preferred embodiments, however the present invention is deemed to be broader than those preferred embodiments, so the full scope of the present invention should be ascertained from the claims which follow.

What is claimed is:

1. In a process for removing a trace level of a Group IVb and Vb metal contaminant from a Group IVb metal tetrahalide by volatilization, the improvement for reducing the level of said Group IVb and Vb metal contaminants from said Group IVb metal tetrahalide which comprises the steps of:
    (a) contacting said Group IVb metal tetrahalide containing a trace level of a Group IVb metal or a Group Vb metal contaminant or both, with a sufficient amount of a compound consisting essentially of a Group IVb metal hydride under conditions for converting said Group IVb and Group Vb metal contaminant to a lower volatile compound;
    (b) separating the Group IVb metal tetrahalide from said lower volatile compound by a vaporization method selected from the group consisting of distillation, sublimation; and combinations thereof; and,
    (c) recovering the resulting Group IVb metal tetrahalide having a reduced level of a Group IVb or Vb metal contaminant as a more volatile component from said lower volatile compound.

2. The process of claim 1 wherein the contacting temperature ranges from 50 to 150° C.

3. The process of claim 2 wherein the Group IVb metal hydride is added to a reboiler for the distillation column.

4. The process of claim 1 where the Group IVb tetrahalide to be purified by having contaminants removed therefrom is first dissolved in a nonreactive medium to allow intimate contact with the hydride purification agent and then, the nonreactive medium is removed prior to purification of the product by sublimation.

5. The process of claim 2 wherein the Group IVb metal tetrahalide is selected from the group consisting of titanium tetrahalide, zirconium tetrahalide and mixtures thereof.

6. The process of claim 2 wherein the Group IVb metal hydride is added at a level that results in the reduction of a Group IVb and Vb metal contaminant to less than 1 ppb each.

7. The process of claim 2 wherein the Group IVb metal hydride is added in the range of 0.01% to 0.2% by weight of the Group IVb metal tetrahalide having contaminants removed therefrom.

8. The process of claim 5 wherein the Group IVb metal tetrahalide is a Group IVb metal tetrachloride or tetrabromide.

9. In a distillation process for removing trace levels of a Group IVb metal or a Group Vb metal or both from a titanium tetrachloride feedstock contaminated with trace levels of a Group IVb metal or a Group Vb metal or both, the improvement for generating a high purity titanium tetrachloride which comprises the steps:
    (a) contacting said titanium tetrachloride feedstock contaminated with trace levels of a Group IVb or Group Vb metal or both with a sufficient amount of a compound consisting essentially of titanium hydride to convert said Group IVb or Group Vb metal to a lower volatile compound;
    (b) distilling the treated feedstock in a distillation column thereby separating the titanium tetrachloride from the lower volatile compound of a Group IVb or Group Vb metal; and,
    (c) recovering the resulting high purity titanium tetrachloride as an overhead fraction.

10. The process of claim 9 wherein the Group IVb metals are zirconium tetrachloride or hafnium tetrachloride.

11. The process of claim 9 wherein the temperature of said contacting ranges from 50 to 150° C.

12. The process of claim 9 wherein the titanium hydride is added to a reboiler for the distillation column.

13. The process of claim 9 wherein the titanium hydride is added in a range of at least a stoichiometric amount up to about 0.02% by weight of the titanium tetrachloride to remove substantially any Group IVb metal or Group Vb metal contaminant therefrom.

* * * * *